US007778877B2

(12) United States Patent
Messer et al.

(10) Patent No.: US 7,778,877 B2
(45) Date of Patent: Aug. 17, 2010

(54) ENHANCED NETWORK BASED PROMOTIONAL TRACKING SYSTEM

(75) Inventors: Stephen D. Messer, New York, NY (US); Cheryl Ho, San Francisco, CA (US); Jianhao Meng, Los Cob, CT (US)

(73) Assignee: Linkshare Corporation, New York, NY (US)

( * ) Notice: Subject to any disclaimer, the term of this patent is extended or adjusted under 35 U.S.C. 154(b) by 715 days.

(21) Appl. No.: 10/192,256

(22) Filed: Jul. 9, 2002

(65) Prior Publication Data

US 2004/0111381 A1 Jun. 10, 2004

Related U.S. Application Data

(60) Provisional application No. 60/303,416, filed on Jul. 9, 2001.

(51) Int. Cl.
*G06Q 13/00* (2006.01)
*G06Q 20/00* (2006.01)

(52) U.S. Cl. .......................................... 705/21; 705/14
(58) Field of Classification Search ................... 705/14, 705/21, 26, 27
See application file for complete search history.

(56) References Cited

U.S. PATENT DOCUMENTS

| | | | |
|---|---|---|---|
| 4,674,041 A | 6/1987 | Lemon et al. |
| 4,941,090 A | 7/1990 | McCarthy |
| 5,025,491 A | 6/1991 | Tsuchiya et al. |
| 5,117,355 A | 5/1992 | McCarthy |
| 5,202,826 A | 4/1993 | McCarthy |
| 5,319,542 A | 6/1994 | King, Jr. et al. |
| 5,537,314 A | 7/1996 | Kanter |
| 5,590,197 A | 12/1996 | Chen et al. |
| 5,692,206 A | 11/1997 | Shirley et al. |
| 5,708,780 A | 1/1998 | Levergood et al. |
| 5,710,884 A | 1/1998 | Dedrick |
| 5,712,979 A | 1/1998 | Graber et al. |
| 5,715,314 A | 2/1998 | Payne et al. |

(Continued)

FOREIGN PATENT DOCUMENTS

JP 407084960 3/1995

(Continued)

OTHER PUBLICATIONS

Selected document from internet.com Web site entitled "DoubleClick, 24/7 Media, L90 Settle Patent Suits" by Pamela Parker, downloaded and printed Jan. 18, 2001 (3 pages).

(Continued)

*Primary Examiner*—Ronald Laneau
(74) *Attorney, Agent, or Firm*—Troutman Sanders LLP

(57) ABSTRACT

A novel communications network tracks and manages Merchant and Affiliate promotional efforts in a seamless, integrated fashion. Operative characteristics include central control over new, Rich Media promotional links, allowing sophisticated promotions employing Java-based presentations or similar to be easily applied across a broad network of connected Affiliate sites. The system accomplishes this, in part, by providing a selective API for use in wrapping the promotional links. In accordance with this protocol, these links may be hosted by the Clearinghouse or Merchant, and sourced from a variety of third-party vendors.

15 Claims, 3 Drawing Sheets

U.S. PATENT DOCUMENTS

| | | | |
|---|---|---|---|
| 5,715,315 | A | 2/1998 | Handelman |
| 5,717,860 | A | 2/1998 | Graber et al. |
| 5,724,424 | A | 3/1998 | Gifford |
| 5,745,681 | A | 4/1998 | Levine et al. |
| 5,796,952 | A | 8/1998 | Davis et al. |
| 5,812,769 | A | 9/1998 | Graber et al. |
| 5,819,285 | A | 10/1998 | Damico et al. |
| 5,848,396 | A | 12/1998 | Gerace |
| 5,855,008 | A | 12/1998 | Goldhaber et al. |
| RE36,116 | E | 2/1999 | McCarthy |
| 5,873,076 | A | 2/1999 | Barr et al. |
| 5,937,392 | A | 8/1999 | Alberts |
| 5,948,016 | A | 9/1999 | Jang |
| 5,948,061 | A | 9/1999 | Merriman et al. |
| 5,963,915 | A | 10/1999 | Kirsch |
| 5,991,735 | A | 11/1999 | Gerace |
| 5,991,740 | A | 11/1999 | Messer |
| 5,999,914 | A | 12/1999 | Blinn |
| 6,006,197 | A | 12/1999 | d'Eon et al. |
| 6,016,504 | A | 1/2000 | Arnold et al. |
| 6,029,141 | A | 2/2000 | Bezos et al. |
| 6,041,309 | A | 3/2000 | Laor |
| 6,047,327 | A | 4/2000 | Tso et al. |
| 6,055,513 | A | 4/2000 | Katz et al. |
| 6,061,660 | A | 5/2000 | Eggleston et al. |
| 6,173,271 | B1 | 1/2001 | Goodman et al. |
| 6,226,618 | B1 | 5/2001 | Downs et al. |
| 6,240,455 | B1 | 5/2001 | Kamasaka |
| 6,263,313 | B1 * | 7/2001 | Milsted et al. ............... 705/1 |
| 6,334,111 | B1 | 12/2001 | Carrott |
| 6,389,538 | B1 * | 5/2002 | Gruse et al. ............... 713/194 |
| 6,587,837 | B1 * | 7/2003 | Spagna et al. ............... 705/26 |
| 6,629,135 | B1 | 9/2003 | Ross et al. |
| 6,804,660 | B2 | 10/2004 | Landau et al. |
| 6,826,594 | B1 | 11/2004 | Pettersen |
| 7,020,622 | B1 | 3/2006 | Messer |
| 7,032,168 | B1 | 4/2006 | Gerace et al. |
| 7,127,419 | B2 | 10/2006 | Messer et al. |
| 7,249,056 | B1 | 7/2007 | Crouthamel et al. |
| 7,269,564 | B1 * | 9/2007 | Milsted et al. ............... 705/1 |
| 7,395,226 | B2 | 7/2008 | Messer |
| 2001/0034646 | A1 | 10/2001 | Hoyt et al. |
| 2001/0037205 | A1 * | 11/2001 | Joao ............... 705/1 |
| 2002/0029290 | A1 * | 3/2002 | Burema et al. ............... 709/238 |
| 2002/0042739 | A1 | 4/2002 | Srinivasan |
| 2002/0055911 | A1 * | 5/2002 | Guerreri ............... 705/64 |
| 2003/0236701 | A1 * | 12/2003 | Rowney et al. ............... 705/14 |
| 2004/0260657 | A1 * | 12/2004 | Cockerham ............... 705/76 |
| 2005/0222906 | A1 | 10/2005 | Chen |
| 2006/0149686 | A1 | 7/2006 | Debonnett |
| 2006/0200555 | A1 | 9/2006 | Shannon et al. |
| 2007/0179849 | A1 | 8/2007 | Jain |
| 2007/0214045 | A1 | 9/2007 | Subramanian et al. |
| 2007/0219865 | A1 | 9/2007 | Leining |
| 2008/0046315 | A1 | 2/2008 | Axe et al. |
| 2008/0120156 | A1 | 5/2008 | Nusbaum |

FOREIGN PATENT DOCUMENTS

| | | | |
|---|---|---|---|
| JP | 02004157952 | 6/2004 | |
| JP | 2006031734 | 2/2006 | |
| JP | 2006323701 | 11/2006 | |
| KR | 2000-0007010 | 2/2000 | |
| KR | 2000-0007069 | 2/2000 | ............... 17/60 |
| KR | 2000-0012690 | 3/2000 | ............... 17/60 |
| KR | 2001-37158 | 5/2001 | |
| WO | WO98/09447 | 3/1998 | |
| WO | WO0111504 | 2/2001 | |
| WO | WO0125957 | 4/2001 | |
| WO | 01/37158 | 5/2001 | |
| WO | WO 01/37158 | 5/2001 | |
| WO | WO0180846 | 11/2001 | |

OTHER PUBLICATIONS

Search results on Internet related patents.

Abstract of United States Patents No. 5,537,314.

John A. Quelch, "The Internet and International Marketing," Sloan Management Review, v37, n. 3, pp. 60-75, Spring 1996.

Selected documents from books.com Web site describing Book Stack's Unlimited's Links Partner Program, downloaded and printed Jun. 20, 1997 and Jun. 23, 1997 (8 pages).

Selected document from Incognito Cafe Web site describing several on-line Bookstore Links, undated (5 pages).

Full text article from Dialog search titled "Booksite launches version 3.0 of the popular electronic commerce web site", Business Wire, Feb. 23, 1996, p. 02231111 (2 pages).

Full text article from Dialog search titled Amazon.Com Introduces 'Amazon.Com Associates'—A New Model for Internet-Based Commerce, Business Wire, Jul. 18, 1996, p. 07181040 (3 pages).

Text journal article for Dialog search titled "Can mixing 'cookies; with online marketing be a recipe for heartburn?" by Foster, Ed, InfoWorld, v18n30 PP:54, Jul. 22, 1996 (2 pages).

Full text journal article from Dialog search titled "Real-Time Travel Info Available Online", Newsbytes News Network, p. N/A, Jan. 17, 1995 (2 pages).

Abstract from Dialog search titled "Online growth 'virtually' untapped; PC vendors taking more advantage of booming sales . . . " by Harrington, Mark, Computer Retail Week, v4, n64, p160 (1), Jun. 6, 1994 (1 page).

Full text titled "GroupLens: An Open Architecture for Collaborative Filtering of Netnews" by Paul Resnick et al., from Proceedings of ACM 1994 Conference on Computer Supported Cooperative Work, Chapel Hill, NC: pp. 175-186 (18 pages).

Full text titled "Fab: Content-Based, Collaborative Recommendation" by Marko Balabanovic et al., Communications of the ACM, Mar. 1997, vol. 40, No. 3 (8 pages).

Krick, J., "A cookie for thoughts: cookies help webmasters harness user habits," Computer Shopper, v17, n7, p610(1).

Full text article from Dialog search titled "Networking and the rise of electronic commerce: The challenge for public policy," Business Economic, v30n4, Oct. 1995, p. 01097255 (10 pages).

Bruce Judson, "Luring Advertisers Prospects to the Web", Advertising Age, p. 16, Aug. 7, 1995.

Fixing Executive Compensation Excesses: The board members who decide a CEO's pay have a fundamental conflict of interest, and shareholders need to have more of a say, by Edward E Lawler III, BusinessWeek, Viewpoint Feb. 5, 2009, http://www.businessweek.com/print/managing/content/feb2009/ca2009025_072667.htm, downloaded Feb. 16, 2009.

Bruce Judson, "Luring Advertisers Prospects To The Web", Advertixing Age, p. 16, Aug. 7, 1995.

Excerpt of Hoyt, U.S. Appl. No. 60/178,260 filed Jan. 25, 2000 on Public Pair (6 pages attached).

Full text article from Dialog search titled "Amazon.Com Introduces 'Amazon.Com Associates'—A New Model for Internet-Based Commerce", Business Wire, Jul. 18, 1996, p. 07181040 (3 pages).

Full text article form Dialog search titled "Booksite launches version 3.0 of the popular elecronic commerce web site", Business Wire, Feb. 23, 1996, p. 02231111 (2 pages).

Full text journal article from Dialog search titled "Real-Time Travel Info Available Online", Newsbytes News Network, p. N/A/, Jan. 17, 1995 (2 pages).

John A. Quelch, "The Internet and International Marketing." Sloan Management Review, v37, n. 3., pp. 60-75, Spring 1996.

Krick, J., "A cookie for thoughts: cookies help webmasters harness user habits," Computer Shopper, v17, n7, p. 610 (1).

Selected document from books.com Web site describing Book Stack's Unlimited's Links Partner Program, downloaded and printed Jun. 20, 1997 and Jun. 23, 1997 (8 pages).

Selected documents from Incognito Cafe Web site describing several on-line Bookstore Links, undated (5 pages).

Text journal article for Dialog search titled "Can mixing 'cookies' with online marketing be a recipe for heartburn?" by Foster, Ed, InfoWorld, v18n30 PP:54 Jul. 22, 1996 (2 pages).

Anonymous: "HTML 4.0 Specification" W3C Recommendation, Apr. 24, 1998, XP002191626 (the whole document).

* cited by examiner

ENHANCED NETWORK BASED PROMOTIONAL TRACKING SYSTEM

This patent application is claiming the benefit of U.S. Provisional Application No. 60/303,416, filed Jul. 9, 2001, the entire disclosure of which is hereby incorporated by reference herein.

U.S. Provisional Application No. 60/303,416 is based upon U.S. application Ser. No. 09/098,860, filed on Jun. 17, 1998, entitled Transaction Tracking And Assessment Data Processing System And Network, by Stephen D. Messer, which is a continuation-in-part of prior application Ser. No. 08/871,921, filed on Jun. 10, 1997, entitled Data Processing System For Integrated Tracking And Management Of Commerce Related Activities On A Public Access Network, by Stephen D. Messer, now issued as U.S. Pat. No. 5,991,740, the disclosure of which is incorporated herein by reference.

FIELD OF THE INVENTION

The present invention generally relates to a novel computer system for managing network-based communications. More particularly, the present invention is directed to a network-based promotional system and method that provides dynamically updated Rich Media centrally stored for selective presentations per pre-defined coding regimen.

BACKGROUND OF THE INVENTION

A sophisticated network promotion tracking and management system is disclosed in U.S. Pat. No. 5,991,740 to Stephen Dale Messer. This system includes a plurality of computers linked together to allow transfer of information and files in accordance with a select profile. Promotions at one computer are used to direct consumers to a Merchant computer where commerce can take place. The system tracks the referrals from the promotion to the commerce and permits proper allocation of commissions for the referral.

The foregoing U.S. Patent and pending patent application Ser. No. 09/098,860 filed on Jun. 17, 1998 are hereby incorporated by reference, forming the foundations for the improvements thereto discussed below as part of the present invention.

While a vast spectrum of variations exists in implementation, the above network promotion tracking includes a Clearinghouse Web Site, where Merchants and Affiliates interact and develop mutually acceptable promotional arrangements consistent with operational considerations. Often, the system includes at the Clearinghouse, select promotional links pre-packaged for ease in implementing by the Affiliate, simply by downloading the link code structure—usually expressed in HTML code. For example, the Clearinghouse server will include banner ads formed by pre-packaged links that include graphics for a select Merchant trademark, such as LL Bean or the like. This allows the Merchant to control the image quality of the banners and eases their implementation by the Affiliate.

In addition, promotional links take forms other than mere banner ads, and can include e-mail, text, search box, and select graphic/image configurations. All these link code packages have in common a static characteristic. That is, once placed on the Affiliate's Web page, the content and appearance remains constant until replaced or updated. Indeed, if the Merchant moves, or the product is discontinued, the link becomes obsolete and unproductive.

Other links are more sophisticated. These links include embedded code for local execution upon activation. For example, the promotional link can include a Java script that provides a short animation upon activation by a potential user, enhancing the overall promotional presentation to the USER. These short programmed applet-based presentations are known as Rich Media because the format allows a substantially richer presentation upon execution. However, even this more sophisticated presentation is static in the sense that once programmed with the Web page, it largely repeats as instantiated. Changing and/or updating the presentation involves the full removal and replacement of the page coding at the Affiliate site, an arduous and complex process particularly with the more sophisticated presentation materials.

These more sophisticated promotional links that include animation or other programmed capabilities are often created by professionals apart from and operating separately from the Affiliates and Merchants within the network. Indeed, these vendors are skilled in this select field of programming and offer their Rich Media applets to the industry pursuant to their individual fee structures. Vendor supply of these Rich Media offerings upon acceptance requires the transfer on select intervals of the Rich Media creative to the subscribing Affiliate from the producers. Problems can arise in this transfer particularly if the Affiliate is without meaningful programming support or lacks the experience to manage updating and modifying promotional applets on a continuous basis.

OBJECTS AND SUMMARY OF THE PRESENT INVENTION

It is an object of the present invention to provide a data processing system to enhance promotional activity across a wide area network.

It is another object of the present invention to provide a computer network-based Affiliate program that supports Rich Media applications having a common protocol for enhanced management.

It is still another object of the present invention to provide a computer-based server having programmed controlled functions to allow Rich Media serving to plural Affiliate Web Sites across a wide area network, such as the Internet.

It is yet another object of the present invention to provide a network-based programming protocol that provides a code wrap for remote stored promotional link commands.

It is yet another object of the present invention to provide a select API for Rich Media creatives that allows centralized storage and/or management of the distribution of the promotions associated with the Rich Media creatives.

It is still another object of the present invention to provide a programming protocol that provides a common interface for supporting Rich Media, Dynamic Text Links, third-party ad serving and select dynamic search box controls.

The above and other objects of the present invention are realized in the application of a selectively programmed group of interconnected servers, linked for network communications to support a plurality of Merchants and Content Providers or Affiliates. The network provides a sophisticated promotional mechanism that presents goods and services to potential customers creating a streamlined gateway for these customers to interact with sponsoring Merchants in placing orders or exploring product characteristics. The system places within this network, a Clearinghouse server that is selectively programmed to manage and implement the promotional activities of the participants. The Clearinghouse server is further configured to provide a coded application program interface (API) that allows for a common protocol for wrapping Rich Media promotions used in support of product and service marketing. In one construct, this involves wrapping a script tag around linking code to be provided to Affiliates. By placing this common protocol in place, the Clearinghouse server thereafter becomes a source for vendors to supply creative media for use by Merchants and Affiliates within the network. In addition, the common protocol permits simplified updating of promotional programs by Merchants across their Affiliate franchise.

The foregoing paradigm has several innovative extensions in use. In one aspect, this process supports a sophisticated applet known as a search box, used on an Affiliate Web Site to enhance product access by users. The search box link may be centrally stored on the Clearinghouse site for hosting directly and in conjunction with the Rich Media creatives in accord with the above protocol.

The foregoing features of the present invention may be better understood by review of the following description of an illustrative example thereof, taken in conjunction with the drawings.

DETAILED DESCRIPTION OF THE INVENTION

In overview, the present invention is directed to an enhancement to an existing network-based Clearinghouse Centric Affiliate Program and the systems designed and implemented to support commerce within the network in accordance with the program dictates. The system, at its more fundamental level, provides tracking and reporting capabilities for a confluence of participating Merchants and Affiliates. In this way, select promotions are deployed at Web Sites throughout the Internet, and link back, first through the Clearinghouse, and then to the Merchant sites to permit commerce on the promoted products, with commissions credited to the appropriate sourcing Web Site.

The system operating characteristics are enhanced by creating a new module for managing creative content and its distribution as the focal of promotional activity. The new module, reference here as the "Rich Media" module, provides the programming support for Merchants to systematically control and update the promotions used on their respective syndicated Affiliate networks. This is made possible by selectively wrapping the promotion code within a select Java script—script tag, that calls a stored implementation program. This wrap provides a common API allowing seamless interchange of creative links for use in the network.

Figure 1:
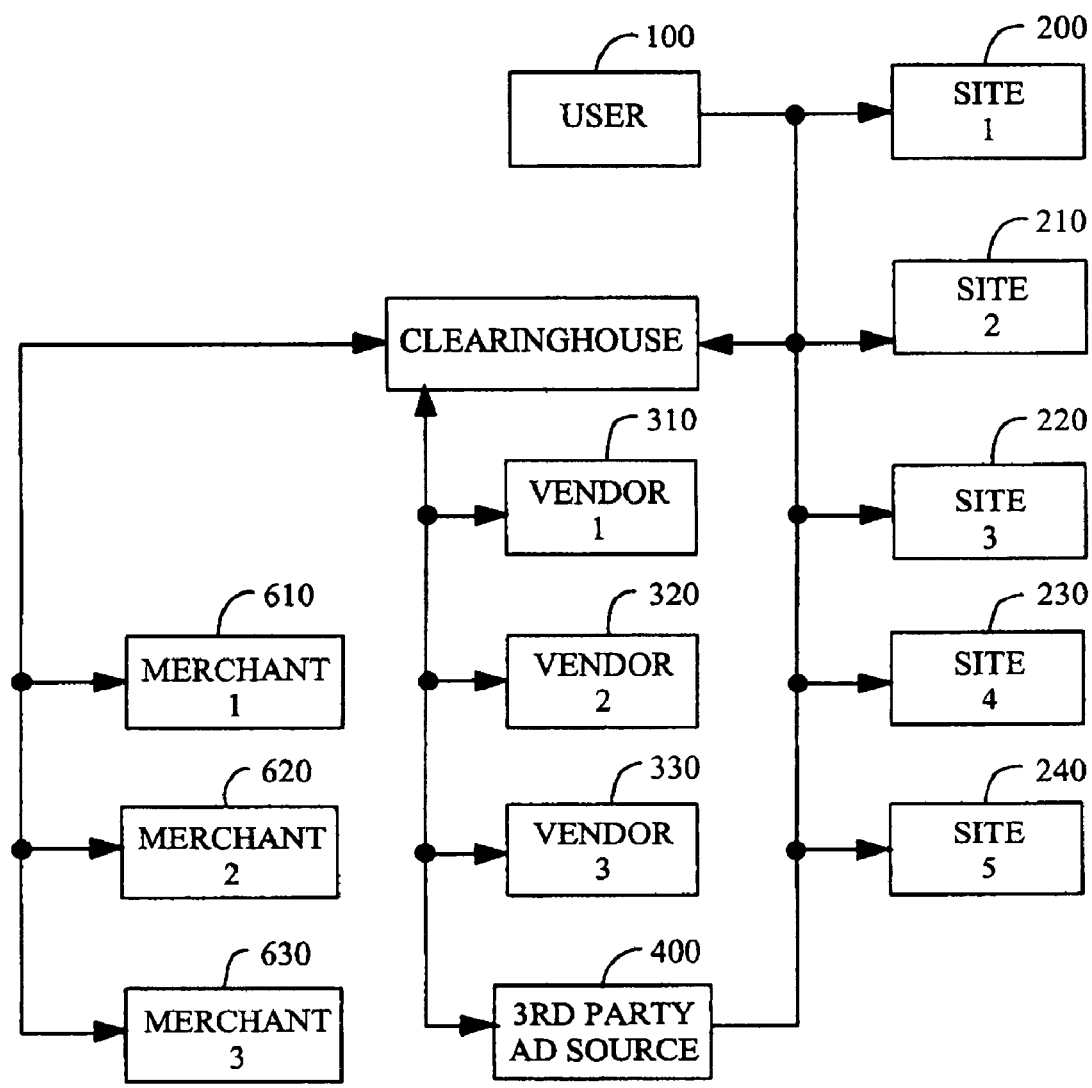
FIG. 1 is a block diagram depicting the operative environment of the present invention.

With the foregoing overview in mind, attention is first directed to FIG. 1, comprising a block diagram of the participants in the present invention. At block 100, a User has a computer or other communication portal device. This may include without limitation all forms of PDAs, cell phones, laptop and desktop processors, equipped with a browser type program capable of downloading and decoding selectively encoded Web pages. As shown in the figure, the User visits sites on the Web (shown graphically as Sites 200-240), where information of interest is available. Interaction with each site involves the downloading of site content—typically Web pages with information and commerce inducing promotions.

Continuing with FIG. 1, the Clearinghouse 500 server resides at the center of activity. In addition to the links from the sites, the Clearinghouse server is linked to Vendors (310-330) as suppliers of creative content for use in the promotions, and the supporting Merchant base, (Merchants 610-630).

Finally, operation is also supported by third-party Ad servers, 400, i.e., Web servers that host ads to the Web Sites.

Operation requires a generic API to support the extension for promotion. Application of this process involves four discrete operations. Initially, and as the first of the operative steps, this requires the Merchant to upload its promotion template, typically HTML code (dynamic link—see below). This template can also comprise the Clearinghouse specific code for, e.g., Affiliate ID variables for placing the Affiliate ID when the Affiliate generates the linking code. The starting template resides in the following exemplary file on the Clearinghouse:

OTHER_HTML.html_clob

This process is demonstrated with the following example, where a simple promotional link is first wrapped and loaded for access, starting with the initial code uploaded as a template—either hosted by the Merchant or uploaded to the Clearinghouse for Clearinghouse hosting, as depicted in Table I:

TABLE I

<P>This product SKU01234 is great!
<A HREF="<lsn click>&tmpid=1&RD_PARM1=SKU01234">
click here to buy</A>

The foregoing is then converted or "wrapped" in a Java script tag and stored at the above file location, as follows:

TABLE II

```
<script language="javascript">
document.write('<P>This product SKU01234 is great!);
document.write('A HREF="' + lsn_click+&tmpid=1&RD_PARM1=
SKU01234">');
document.write('click here to buy</A>')
</script>
```

The above code wrap operation is for sourcing the promotion to the Affiliate network from the Clearinghouse server directly. An alternative approach is available and involves hosting the promotional content from the Merchant site. This requires the Clearinghouse server to store the URL of the Merchant server in the designated page:

OTHER_HTML.media_url:

http://www.merchant.com/linkshare/medial.js

In this example, LinkShare is the Clearinghouse, the content of medial.js is the same as OTHER_HTML.html_clob and is the same as depicted above for the Clearinghouse server example.

In either approach—Clearinghouse or Merchant hosting—the next operative step involves the generation of the Affiliate linking code. As depicted below, the Clearinghouse will generate Affiliate linking code within the "OTHER MEDIA" module, using the implementation program ("show" in this example), listed here as "14":

TABLE III

```
<script src="http://ad.linksynergy.com/fs-bin/show?id=
IMh2Xiq9xN0&bids=11111.1&type=14&subid=0">
</script>--
```

NOTE: The Affiliate may freely append u1 parameters or wrap any other variables into the link, e.g., &u1=my_u1_number.

TABLE IV

```
<script>
var lsn_click="http://click.linksynergy.com/fs-bin/click?1Mh2Xiq9x
N0&offerid=11111&type=14&subid=0&u1=my_u1_number";
</script>
<!--from OTHER_HTML.html_cob-->
<script language="JavaScript">
document.write('<P>This product SKU01234 is great!');
document.write('<A HREF="' + lsn click + '&tmpid=1&RD_PARM1=
SKU01234">');
document.write('click here to buy </A>')
(/script>
```

For hosting on the Merchant site, the system creates the following instruction set:

TABLE V

```
<script>
var lsn_click="http://click.linksynergy.com/fs-bin/click?1Mh2Xiq9x
N0&offerid=11111&type=14&subid=0&u1=my_u1_number";
</script>
<!--from OTHER_HTML.media_url-->
<script language="JavaScript" src="http://www.merchant.com/linkshare/
medial.js"
</script>
```

The Java script will be executed by user's browser to produce the final HTML code:

TABLE VI

```
<P>This product SKU01234 is great!
(A HREF="http://click.linksynergy.com/fs-bin/click?1Mh2Xiq9x
N0&offerid=11111&type=14&subid=0&u1=my_u1_number&tmpid=
1&RD_PARM1=SKU01234">
Click here to buy</A>
```

The Rich Media feature allows third-party vendors to partner with the Merchants, and offer their Rich Media creative directly to Affiliates through the Network. Third-party vendors will need to comply with the above specifications in order to provide their Rich Media creative to the Affiliates. A Web area is provided where Merchants can directly upload this code for their Affiliates. The system will check this code for compliancy, and process it in the system. On the Affiliate side, the system provides a Create Links area of the Affiliate interface where an Affiliate can generate the appropriate code for such creative.

Affiliate Side—Rich Media

The Affiliate interface to accommodate the new Rich Media creative offerings will have the following characteristics:

Join Programs/Account—Page

This is the page Affiliates see either 1) before they apply to a Merchant's program in order to find out more information about the program (Join Programs), or 2) after they have been approved and want to review information about a program in which they are already participating (Account). Within this page is an area that indicates the types of links which are available from a particular Merchant. If a Merchant has uploaded a Rich Media banner, the words "Rich Media" should appear in a new box under "Link Types Available".

Create Links—Page

When an Affiliate selects a Merchant for which to generate links, he accesses the page above. This page displays all the link types which are available to the Affiliate. If a Rich Media banner has been uploaded into a particular Merchant's account, the Rich Media link should appear in the left hand tool bar for that Merchant. When an Affiliate clicks on the link for Rich Media creative, he should arrive at a page that looks like this:

Rich Media creative available to the Affiliate will be displayed by Category. There will also be a search tool above in case the Affiliate knows exactly what Rich Media creative he is looking for. The categories displayed here are the same as the Image Categories. However, if there is a Category for which there are no Rich Media creative assigned, the Category name will not appear as a choice to the Affiliate. If the Affiliate clicks on a Category, the system will return all Rich Media links uploaded into the system available to this Affiliate under that particular Category.

Note that matches are returned with 25 entries to a page. The Affiliate can click to the next page, or jump to any page by using the page index at the top and bottom of the screen. Rich Media links are displayed by Name and Description entered by the Merchant upon upload into the system. If the Affiliate types in a query to search for a specific keyword in all categories, the system will return all matches broken down by Category.

Note that it shows a maximum of five entries for each Category. To see additional matches, the Affiliate clicks on "More Matches in Category Name" and retrieves the full listing just as it would appear in the Category page above. Once the user finds a Rich Media link he/she would like to use, he/she simply clicks on the Rich Media link name to generate the appropriate code, which appears to the Affiliate.

A sample of the Rich Media creative appears with the appropriate code for the Affiliate to place on his/her site.

Reports

Rich Media links will drive impressions, clicks, and sales just like any other link type. As such, activity generated by Rich Media links will be rolled up into reports just like all the other link types. Total impressions, clicks, and sales generated from Rich Media links will be included within all reports.

Merchant Side—Rich Media

Several modifications will also have to be made in the Merchant interface to accommodate the new Rich Media creative offerings. The interfaces that will be affected are as Links/Merchandising, Reports.

Links/Merchandising

The "Rich Media" section of the Clearinghouse allows Merchants to upload their Rich Media creative. The Merchant specifies the name of the Rich Media link, as well as the type of link he/she is uploading, using a drop down menu or similar for type selection from a pre-established list. This drop down will display the names of third-party vendors approved by the Clearinghouse, as well as providing a "Custom" option for those Rich Media links which the Merchant has designed him/herself.

When a Merchant uploads code for their Rich Media link, the LinkShare system will perform a series of checks to ensure that the code is legitimate. For example, if the Merchant is uploading code for a specific third-party vendor partner, and selects the appropriate vendor, the system will check to make sure that the code uploaded meets certain criteria for that specific vendor.

As discussed briefly above, the application of these protocols allows implementation of a select processing tool known as a "search box". Under this protocol and for the preferred configuration, these search boxes should conform to the following conventions:

Search Convention

The query will search database to return all entries which match at least one of the words entered, unless advanced syntaxes are used (see below).

1. Searched Fields (in Create Links and Links/Merchandising)

Submitted queries will search all of the following fields for matches: Name, ID, Description.

2. List All

Affiliate types a "*" and hits "Go" to list all entries within a specific Category, Size, or Type.

3. Partial Word Match

Place a * at the end of a word to return right side partial matches. For example, link* will return all entries containing matches with link, links, linked, linking, and LinkShare.

Place a * at the beginning of a word to return all left side partial matches. For example, *share will return all entries containing matches with mindshare, LinkShare, and TrafficShare.

If an Affiliate simply types "link" or "share", the search will NOT return any of the terms above. It is important to note that only exact matches will be returned.

4. Phrase Matching

Place quotes around a set of words to find results that match all words in that exact sequence. For example, "LinkShare Network" would return all results in which the word LinkShare appeared directly before the word Network.

5. Required and Prohibited Words

Use a + sign in front of a word to require that the word be found in all of the search results. For example, program would return all results with the word program whereas program+Affiliate would return all results that contained both Affiliate and program.

Use a – sign in front of a word to require that the word not be found in any of the search results. For example, Affiliate-program would return all results that contained the word Affiliate, but not the word program.

Figure 2:
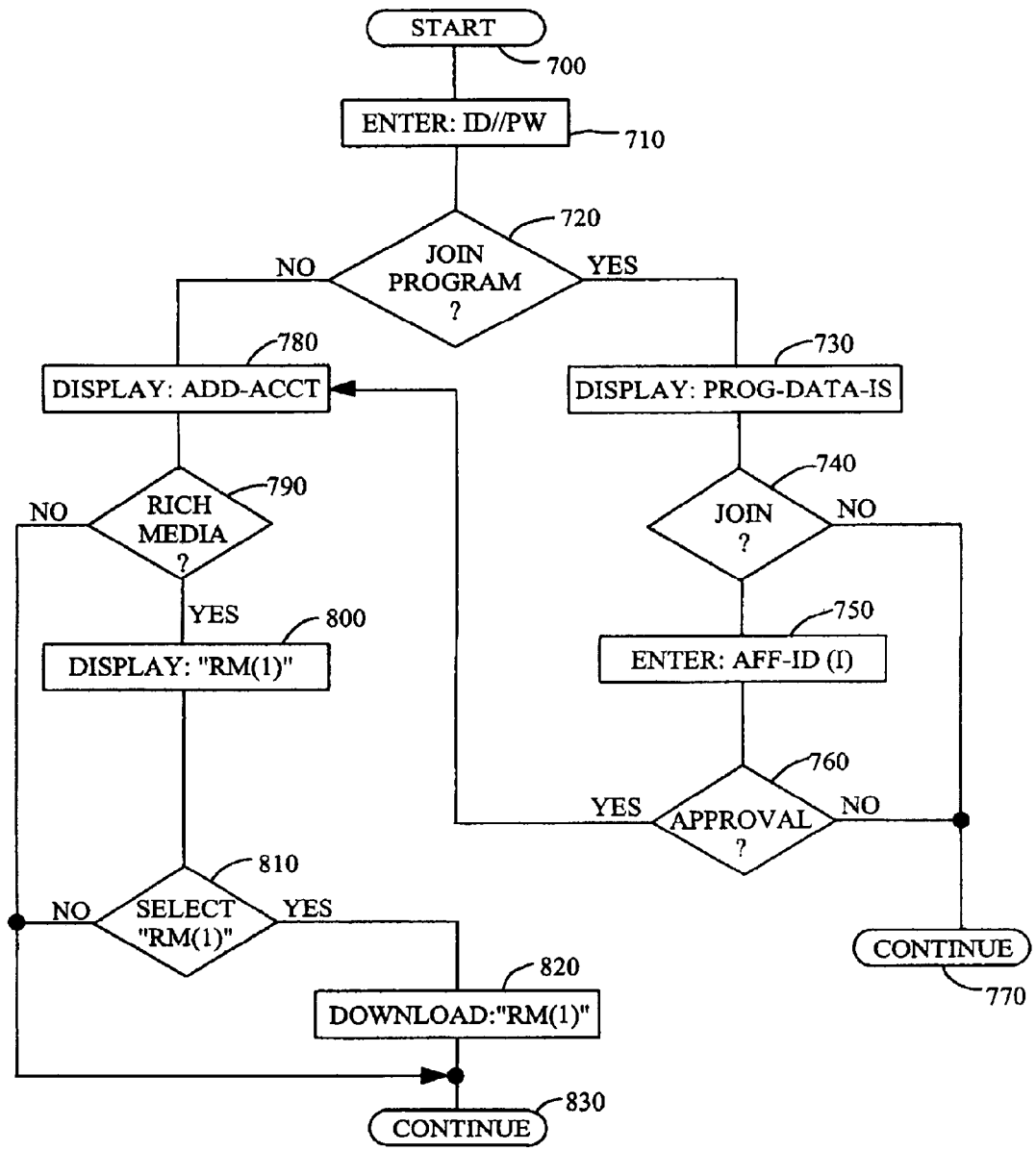
FIG. 2 is a logic flow chart for the Affiliate interface.

Turning now to FIG. 2, Affiliate interaction with the Clearinghouse is provided and initiated via entry of the appropriate Affiliate ID and password, block 710. Test 720 queries on joining as an Affiliate. A positive response branches logic to block 730 and the display of program details. If acceptable, Yes to Test 740 creates the new account Aff(I), which is then subject to approval, Test 760.

Continuing with FIG. 2, after approval, the specific Affiliate accounts details are presented, block 780, including Rich Media promotions under a separate heading. Test 790 allows selection of this category and display of choices on the site at block 800. If the Affiliate funds an appropriate promotion, _is selected, Test 810 and then directly downloaded to the Affiliated at block 820. Logic continues at block 830.

Dynamic Text Links

The Dynamic Text link feature allows the Merchant to create text links that can be dynamically updated or modified on an Affiliate's site. The Merchant can combine images with text, and change the entire content and layout dynamically across his/her Affiliate sites instantaneously. Dynamic Text Links can be as simple as a single word, to a list of top ten bestsellers with images surrounding the text. The difference between Rich Media and Dynamic Text Links is that Dynamic Text Links are to be used for basic HTML creative that combines simple text with simple images. The focus is on textual content vs. creative imagery. Dynamic Text Links can typically be created by an Affiliate program manager, whereas Rich Media links often require the expertise of a specialist.

Affiliate Side-Dynamic Text Links

Several modifications will have to be made in the Affiliate interface to accommodate the new Dynamic Text Link offerings. The interfaces that will be affected are as follows: Create Links, Reports.

Create Links

Dynamic text links will be offered to Affiliates visiting the Clearinghouse server, by selective presentation of "Create Links".

The page will conform to the new standard of presenting links and will mirror how Rich Media links are presented. A search box is provided, and will allow the Affiliate to query by Category or by Type (Dynamic or Static, instead of "Size" used in the Rich Media link search box).

The Create Links area will present both current Static links, as well as the new Dynamic Text links. The new interface will present all links by category, and allow the Affiliate to drill down or search for the specific link he/she is interested in. The list of entries will distinguish all text links as either Dynamic or Static. It will also show Name, ID, and either description (Dynamic) or the actual text link (Static). When Affiliates find the link that they want, they click on "Get Code". If it is a Static Text Link, a screen will appear with the code for both a text link as well as an email link:

http://alogin.linksynergy.com/php-bin/aff/
        showmerchant.shtml?oid=6919&subid=&roid=&link
        type=3&showcode=Y&is special=&pid=3

If it is a Dynamic Text Link, the screen will show an example of the Dynamic Text Link, as well as provide the appropriate code.

Reports

Dynamic Text Links will drive impressions, clicks, and sales just like any other link type. As such, activity generated by Dynamic Text links will be rolled up into reports just like all the other link types. Note that Dynamic Text Links are to be treated just like regular text links-type=3. Total impressions, clicks, and sales generated from Dynamic Text Links will be included within all reports, requiring no modifications to any of the report appearances. It is important to note that a drill down in the Link Type report will be necessary as follows:

Link Type Report

The Text Link line item in the Link Type report should drill to a breakdown of activity between Static vs. Dynamic Text Links. Each of these will then drill down further to activity by specific text link ID.

Merchant Side-Dynamic Text Links

The Merchant interface to accommodate the new Dynamic Text Link offerings are Links/Merchandising, Reports.

Links/Merchandising

A new link for "Dynamic Text Links" will be available for Merchants under the Links/Merchandising area. Access to this new "Dynamic Text Links" upload area must be restricted only to those Merchants who have opted in to this new feature.

The screen lists the Dynamic Text Links that have already been created, to allow the Merchant to modify these links at any time. The screen shows the first ten, and allows the Merchant to view the links on the next page or by jumping directly to subsequent screens. The Merchant can edit any existing link by simply clicking on the ID number. A Merchant can also modify the status of a link, assign it to specific Programs, or assign it to specific Groupings. To create a new Dynamic Text Link, the Merchant clicks on "Create New Link".

This brings a new screen that provides the Merchant with a series of Dynamic Link templates. These templates simply provide the basic HTML foundation for each of the various formats. Because Dynamic Text Links are using the Rich Media API structure, a Merchant can essentially upload anything in this section. However, anything uploaded here will be classified as a Dynamic Text Link in the system. Exemplary templates provided to the Merchant are as follows:

Text Only

Provides the outline for creating a link for Affiliates that consists only of text—great for content, news, stories, and any other text copy that a Merchant would like to syndicate across Affiliate sites.

Vertical Display

Provides the outline for creating a text link underneath an image—recommended for product highlights to provide both graphical and textural descriptions of the featured products.

Horizontal Display

Provides the outline for creating a link that displays image and text side by side—recommended for product highlights with longer descriptions, or for content that may be supported with an image.

List

Provides the outline for creating a list of product or content features—ideal for highlighting top ten products, services, headlines, stores, gift ideas, etc.

Custom

No outline is provided. Merchant can completely customize their Dynamic Text Link—for advanced users who are familiar with HTML and who want to design a customized display for their Affiliates.

Note that each of the template screens includes an option for the Merchant to activate a "Remote Update". If the Remote Update check box is checked, the Merchant must enter a URL location where the Dynamic Text code resides and under the Merchant's control. The Merchant is responsible for updating the remote location with new content. This remote location must house the code exactly as it would be uploaded into the LinkShare system. The Remote Update feature provides a way for Merchants to update their Dynamic Text Links without having to log in to their merchant account each time.

A Preview button allows the Merchant to view the Dynamic Text Link as uploaded by the Merchant. This allows the Merchant to check for errors in the HTML coding.

The Reset button refreshes the screen, and returns the screen back to the default. If the Merchant has altered any of the code within the code box, it will be erased, and the original template code will appear in the code box. This is to allow a Merchant to start all over if he/she has made any mistakes.

The Submit button uploads the Dynamic Text Link into the Clearinghouse system. Once a Merchant clicks on the Submit button, the screen will refresh to the index screen, showing the page where the newly submitted link appears. The Merchant can then continue to assign programs and groupings. The link is "Active" upon submission.

Figure 3:
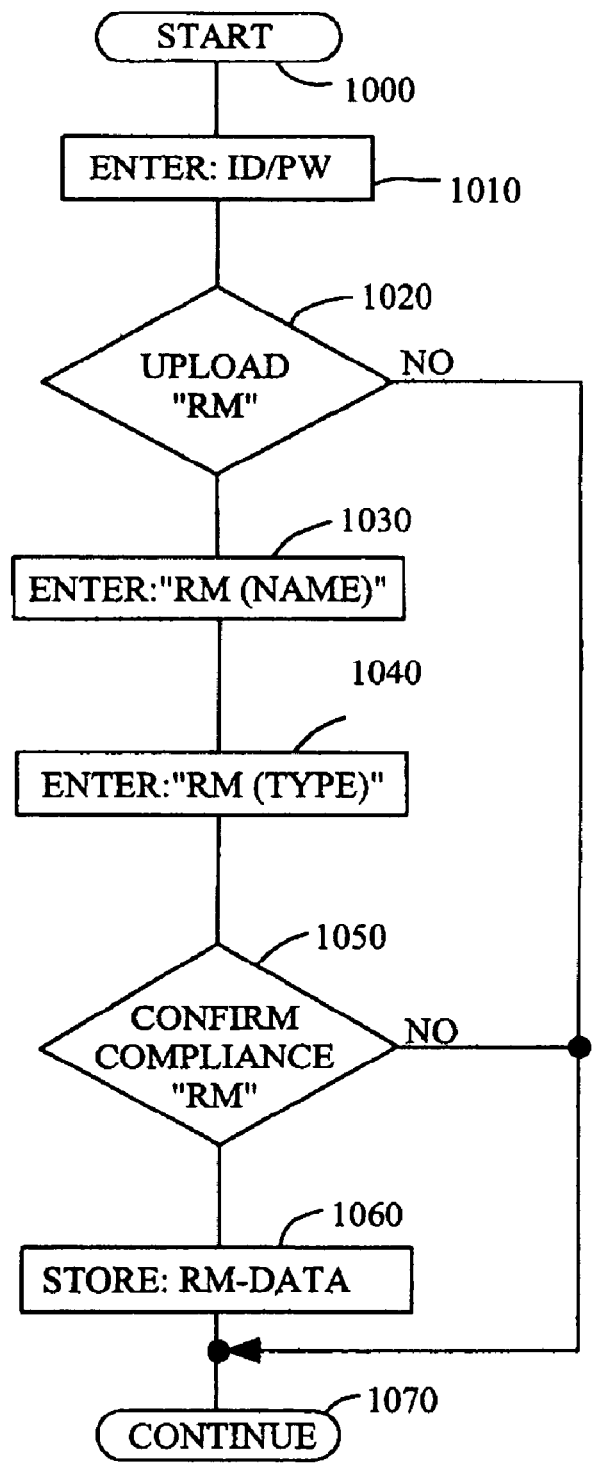
FIG. 3 is a logic flow chart for the Merchant interface.

A simplified flow diagram for the merchant side is depicted in FIG. 3, starting at block 1000 and entry of Merchant ID and password at block 1010. Test 1020 queries on whether the Merchant has selected an upload "RM" command, indicating a desire to install a new creative. A positive response directs system logic to blocks 1030-1040, and the entry of the RM details, e.g., the "name" and "type". At Test 1050, the system tests the uploaded RM for compliance with successful passage resulting in storage of the RM, block 1060.

Third Party Ad Serving

Merchants have the option of hosting link promotions or having the Clearinghouse or any third-party provider, or the Affiliate serve the image. A Merchant can dynamically update banners being used by Affiliates by simply uploading the new banner into the Clearinghouse system, if the image is served by the Clearinghouse. If the image is served by a third party, the Merchant can only dynamically update banners by changing the image stored at the image URL—the image URL itself cannot change. By using the Rich Media API feature to wrap a pre-select tag around the image URL, Merchants can change the image URLs directly on an Affiliate's Web Site by simply uploading the new URL into the Clearinghouse system. The Merchant is further enabled to completely change serving parties without requiring Affiliates to generate new code and replace links.

Merchant Side-Third Party Ad Serving

If a Merchant wishes to utilize Rich Media API enabled images, he should upload the image URL as usual, and select Enabled in the Image Serving Party drop down box. A check box also allows the Merchant to specify that a Clearinghouse selected URL is to be used for the Rich Media API enabled image. This is necessary if the Merchant wishes to keep their options open about the serving party of their images.

Dynamic Search Box

In the past, Merchant clients offered Search Boxes to their Affiliates. The code for these Search Boxes was manually uploaded into the system by the technical department, via Technical Consultants. They are then provided to Affiliates, and copied by Affiliates directly onto their sites. As such, if any changes or updates to the Search Box are made by the Merchant, the Affiliate is required to generate new code, and replace the current code on his/her site.

This is replaced by the inventive process discussed above relating to the Rich Media features. The only difference is the type of creative. Search Box is associated with search box and drop down banners, while Rich Media is associated with all other types of links that feature interactivity and designed using Java, XML, and other special coding. While the process for tracking these two forms of promotion are kept separate, the operative characteristics for implementation are the same, as discussed below:

Affiliate Side-Dynamic Search Box

Nothing changes on the Affiliate side, except that when code for a Rich Media API enabled image is provided to an Affiliate, the Image Serving Party is labeled as Enabled. The initial screen includes an index of Search Boxes available to the Affiliate in the same format that we do for Rich Media, Textual/Email, etc.

Merchant Side-Dynamic Search Box

At the Clearinghouse server, a Web area is created for access and is called the Search Box. In this application, the drop down box for type of link will be either Static or Dynamic. If Static, then the code that a Merchant uploads is provided directly to the Affiliate. If Dynamic, then the system wraps a Clearinghouse API script tag around the code so that the code can be changed and updated at any time.

EXAMPLE 1

The following is an example of the present invention, and specifically the use of a select Rich Media API to wrap code for use in the promotion of products on the Network.

1. Merchant will enter these as a template in 'other_html'. The "cut here" reflects the ease of cut and paste application of the requisite coding.

```
----------cut here----------
<HTML>
<BODY>
    <applet code= jCard.class"
    codebase= http://bigstar.epod.com/bigstar"align="baseline" width=
    238
    height=271 archive="jCard.jar">
    <a href=http://www.bigstar.com><img border=)
    src=http://bigstar.epod.com/bigstar/Component/c15/default.gif width=
    238 height=271></a>
    <PARAM NAME="obj" VALUE=15">
    <PARAM NAME="kioskid" VALUE=15">
    <PARAM NAME="affksk" VALUE=1000000863">
    <PARAM NAME="attribute" VALUE=A00018">
    <!--LinkShare required parameters-- >
    <PARAM NAME="lsn_click_url"
        VALUE= "<lsn click>&tmpid=1&RD_PARM1=
        <RD_PARM1>"
    <PARAM NAME="productlist" VALUE="AB0001/AB0002/
    AB0003"
    <!--end of LinkShare-- >
    </applet>
</BODY>
</HTML?
----------end----------
```

2. The Clearinghouse will generate this linking code for the Affiliate:

```
----------cut here----------
<script src="http://ad.linksynergy.com/fs-bin/show?id=
1Mh2Xiq9xN0&bids=11111.1&type=14&subid=0">
</script>
----------end----------
```

3. The Clearinghouse 'show' program will generate Java script that writes out:

```
----------cut here----------
<HTML>
<BODY>
    <applet code="jCard.class"
    codebase="http://bigstar.epod.com/bigstar" align="baseline" width=
    238
    <HTML>
<BODY>
    <applet code= jCard.class"
    codebase="http://bigstar.epod.com/bigstar" align="baseline" width=
    238
    height=271 archive="jCard.jar">
    <a href="http://www.bigstar.com"><img border=0
    src="http://bigstar.epod.com/bigstar/Component/c15/default.gif
    "width=238 height=271></a>
    <PARAM NAME="obj" VALUE=15">
    <PARAM NAME="kioskid" VALUE=15">
    <PARAM NAME="affksk" VALUE=1000000863">
    <PARAM NAME="attribute" VALUE=A00018">
    <!--LinkShare required parameters-- >
    <PARAM NAME="lsn_click_url"
        VALUE= http://click.linksynergy.com/fs-
        bin/click?id=1Mh2Xiq9xN0&offerid=4506&u1=1234&sku=
        <RD_PARM1>>
    <PARAM NAME="productlist" VALUE="AB0001/AB0002/
    AB0003"
    </applet>
</BODY>
</HTML?
----------end----------
```

4. At this point, the Merchant will display their Java and VB script, etc. If the user clicks on any product, Merchant will replace the <RD_PARM1> in the Clearinghouse "lsn_click_url" variable with the sku number that user clicks on:

```
----------cut here----------
Location: http://click.linksynergy.com/fs-bin/click?id=
1Mh2Xiq9xN0&offerid=4506&u1=1234&sku=AB0001
----------end----------
```

Although the invention has been described in detail for the purpose of illustration, it is to be understood that such detail is solely for that purpose and that variations can be made therein by those skilled in the art without departing from the spirit and scope of the invention. For example, although Rich Media presentations are described throughout the specification, this is for illustrative purposes, as other forms of visual and/or audible presentations could be provided. Such variations are within the spirit and scope of the invention.

What is claimed is:

1. A Clearinghouse system in communication with a computer network that includes a plurality of Merchant sites and a plurality of content provider web pages, each Merchant site providing computer-based access to at least one of goods and services, the system comprising:
    a first software module embodied on a non-transitory computer readable medium, wherein the first software module when executed causes a computer to configure promotions for placement in content provider web pages, wherein said first software module causes said computer to configure said promotions so that:
        said promotions contain a common coding protocol instruction which, when executed by a Web browser, causes said Web browser to request a promotional presentation from said Clearinghouse system, and said promotions, when selected by a user, cause said Web browser to be redirected from a content provider web page first to said Clearinghouse system, and, thence, to a Merchant site associated with said selected promotion;
    a non-transitory computer-readable medium containing promotional presentations based on said common coding protocol, wherein each of said promotional presentations is associated with a promotion in a content provider web page;
    a second software module embodied on a non-transitory computer readable medium, wherein the second software module when executed causes said computer to handle Web browser requests for a promotional presentation associated with a promotion in a content provider web page, wherein said second software module causes said computer to retrieve from said computer-readable medium said promotional presentation associated with said promotion, and communicates said promotional presentation to said Web browser; and
    wherein said system includes a clearinghouse server that tracks commerce associated with said promotions.

2. The Clearinghouse system of claim 1, further comprising a partitioned Web Site program that provides separate areas for Merchant and Affiliate access to promotional presentations for selective uploading and downloading.

3. The Clearinghouse system of claim 1, wherein the promotional presentations are selected from the group consisting of: e-mail, search box, text, banner, and storefront.

4. The Clearinghouse system of claim 1, wherein said common coding protocol is Java script.

5. The Clearinghouse system of claim 1, wherein one or more Affiliates access the Clearinghouse sever for selective review of one or more Merchant offerings.

6. The Clearinghouse system of claim 1, further comprising a module that tracks User interactions with the promotional presentations.

7. A computer implemented method for managing promotional presentations in an Internet-based computer network, the method comprising:
   a) configuring, by a computer, promotions for placement in content provider web pages, wherein said promotions are configured so that:
      said promotions contain a common coding protocol instruction which, when executed by a Web browser, causes said Web browser to request a promotional presentation from a Clearinghouse server, and
      said promotions, when selected by a user, cause said Web browser to be redirected from a content provider web page first to said Clearinghouse server, and, thence, to a Merchant site associated with said selected promotion;
   b) providing, by said computer, a plurality of promotional presentations based on said common coding protocol, wherein each of said plurality of promotional presentations is associated with a promotion on a content provider web page;
   c) in response to a request from a Web browser for a promotional presentation associated with a promotion in a content provider web page, communicating, from said computer, said promotional presentation associated with said promotion to said Web browser; and
   further comprising tracking commerce associated with the promotions.

8. The method of claim 7, wherein the promotional presentations are selected from the group consisting of: a search box, e-mail, dynamic text, Java script promotion, and applet-driven promotion.

9. The method of claim 7, wherein the common coding protocol is Java script.

10. A Clearinghouse system in communication with a computer network that includes a plurality of Merchant sites and a plurality of content provider web pages, each Merchant site providing computer-based access to at least one of goods and services, the system comprising:
   a first software module embodied on a non-transitory computer readable medium, wherein the first software module when executed causes a computer to configure promotions for placement in content provider web pages, wherein said first software module causes said computer to configure said promotions so that:
      said promotions contain a common coding protocol instruction which, when executed by a Web browser, causes said Web browser to request a promotional presentation from said Clearinghouse system, and
      said promotions, when selected by a user, cause said Web browser to be redirected from a content provider web page first to said Clearinghouse system, and, thence, to a Merchant site associated with said selected promotion;
   a non-transitory computer-readable medium containing URLs of Web sites which contain promotional presentations, wherein each of said URLs is associated with a promotion in a content provider web page;
   a second software module embodied on a non-transitory computer readable medium, wherein said second software module when executed causes a computer to handle Web browser requests for a promotional presentation associated with a promotion in a content provider web page, wherein said second software module when executed causes said computer to retrieve from said computer-readable medium a URL associated with said promotion, and communicates a common coding protocol instruction to said Web browser which causes said Web browser to request said promotional presentation from said URL; and
   wherein said system includes a clearinghouse server that tracks commerce associated with said promotions.

11. The Clearinghouse system of claim 10, wherein at least one of said URLs points to one of said plurality of Merchant sites.

12. The Clearinghouse system of claim 10, wherein the computer network further includes a plurality of hosting computers distinct from sail plurality of Merchant sites, wherein at least one of said URLs points to one of said plurality of hosting computers.

13. A computer implemented method for managing promotional presentations in an Internet-based computer network, the method comprising:
   a) configuring, by a computer, promotions for placement in content provider web pages, wherein said promotions are configured so that:
      said promotions contain a common coding protocol instruction which, when executed by a Web browser, causes said Web browser to request a promotional presentation from a Clearinghouse server, and
      said promotions, when selected by a user, cause said Web browser to be redirected from a content provider web page first to said Clearinghouse server, and, thence, to a Merchant site associated with said selected promotion;
   b) providing a plurality of URLs of Web sites that contain promotional presentations, wherein each of said plurality of URLs is associated with a promotion in a content provider web page; and
   c) in response to a request from a Web browser for a promotional presentation associated with a promotion in a content provider web page, accessing, by said computer, said URL associated with said promotion, and communicating, from said computer, a common coding protocol instruction to said Web browser which causes said Web browser to request said promotional presentation from said URL associated with said promotion; and
   further comprising tracking commerce associated with the promotions.

14. The method of claim 13, wherein at least one of said URLs points to a Merchant site.

15. The method of claim 13, wherein at least one of said URLs points to a hosting computer distinct from any Merchant site.

* * * * *